(12) United States Patent
Lee et al.

(10) Patent No.: US 10,893,553 B2
(45) Date of Patent: Jan. 12, 2021

(54) METHOD FOR CONNECTING WITH NETWORK AT UE IN WIRELESS COMMUNICATION SYSTEM AND APPARATUS THEREFOR

(71) Applicant: LG ELECTRONICS INC., Seoul (KR)

(72) Inventors: Jaewook Lee, Seoul (KR); Jinsook Ryu, Seoul (KR); Daewook Byun, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 16/069,856

(22) PCT Filed: Jan. 13, 2017

(86) PCT No.: PCT/KR2017/000474
§ 371 (c)(1),
(2) Date: Jul. 12, 2018

(87) PCT Pub. No.: WO2017/123048
PCT Pub. Date: Jul. 20, 2017

(65) Prior Publication Data
US 2018/0376524 A1 Dec. 27, 2018

Related U.S. Application Data

(60) Provisional application No. 62/278,477, filed on Jan. 14, 2016, provisional application No. 62/290,406, filed on Feb. 2, 2016.

(51) Int. Cl.
*H04W 76/11* (2018.01)
*H04W 76/10* (2018.01)
(Continued)

(52) U.S. Cl.
CPC ............ *H04W 76/11* (2018.02); *H04W 76/10* (2018.02); *H04W 76/19* (2018.02); *H04W 76/27* (2018.02)

(58) Field of Classification Search
CPC combination set(s) only.
See application file for complete search history.

(56) References Cited

U.S. PATENT DOCUMENTS 9,860,924 B2 * 1/2018 Ianev ................. H04W 4/20
2012/0269099 A1 * 10/2012 Chin ................. H04L 65/1016
370/259

(Continued)

OTHER PUBLICATIONS

PCT International Application No. PCT/KR2017/000474, Written Opinion of the International Searching Authority dated Apr. 17, 2017, 8 pages.

(Continued)

*Primary Examiner* — Asad M Nawaz
*Assistant Examiner* — Syed Ali
(74) *Attorney, Agent, or Firm* — Lee Hong Degerman Kang Waimey

(57) ABSTRACT

A method for communicating with a network at a user equipment (UE) in a wireless communication system is disclosed. The method includes steps of suspending a connection with the network; selecting one of a first connection procedure or a second connection procedure based on a cause value of a connection provided from a higher layer; and performing the selected connection procedure, wherein the cause value of the connection is determined according to a type of data to be transmitted.

2 Claims, 4 Drawing Sheets

(51) Int. Cl.
*H04W 76/19* (2018.01)
*H04W 76/27* (2018.01)

(56) References Cited

U.S. PATENT DOCUMENTS

| | | | | |
|---|---|---|---|---|
| 2013/0039287 A1* | 2/2013 | Rayavarapu | ........ | H04W 68/005 370/329 |
| 2013/0260810 A1* | 10/2013 | Rayavarapu | .......... | H04W 76/19 455/509 |
| 2013/0260811 A1* | 10/2013 | Rayavarapu | .......... | H04W 76/19 455/509 |
| 2014/0016614 A1* | 1/2014 | Velev | .................. | H04W 36/165 370/331 |
| 2014/0220981 A1 | 8/2014 | Jheng et al. | | |
| 2014/0321371 A1* | 10/2014 | Anderson | ............. | H04W 76/38 370/329 |
| 2015/0223146 A1 | 8/2015 | Pinheiro et al. | | |
| 2015/0296444 A1 | 10/2015 | Sfar | | |
| 2015/0304937 A1 | 10/2015 | Kim et al. | | |
| 2015/0334769 A1* | 11/2015 | Kim | ........................ | H04L 5/001 370/329 |
| 2016/0242220 A1* | 8/2016 | Jung | ...................... | H04W 8/005 |
| 2017/0064487 A1* | 3/2017 | Buckley | .................. | H04W 4/70 |
| 2018/0035420 A1* | 2/2018 | Centonza | ............ | H04W 72/048 |
| 2018/0332462 A1* | 11/2018 | Kim | ........................ | H04W 28/02 |
| 2018/0352593 A1* | 12/2018 | Velev | .................... | H04W 24/08 |
| 2020/0275339 A1* | 8/2020 | Chin | .................... | H04W 74/006 |

OTHER PUBLICATIONS

European Patent Office Application Serial No. 17738677.8, Search Report dated Aug. 12, 2019, 7 pages.

Ericsson, "RRC Connection Suspend and Resume", 3GPP TSG RAN WG2 Meeting #92, R2-156395, XP051024798, Nov. 2015, 11 pages.

* cited by examiner (A) Control-plane protocol stack (B) User-plane protocol stack

METHOD FOR CONNECTING WITH NETWORK AT UE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/000474, filed on Jan. 13, 2017, which claims the benefit of U.S. Provisional Application No. 62/278,477, filed on Jan. 14, 2016, and 62/290,406, filed on Feb. 2, 2016, the contents of which are all hereby incorporated by reference herein in their entirety.

TECHNICAL FIELD

The present invention relates to a wireless communication system and, more particularly, to a method for connecting with a network at a user equipment (UE) in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF INVENTION TECHNICAL PROBLEM

Based on the above discussion, the present invention proposes a method for connecting with a network at a user equipment (UE) in a wireless communication system and an apparatus therefor.

Solution to Problem

In accordance with an example of the present invention, a method for communicating with a network at a user equipment (UE) in a wireless communication system is disclosed. Especially, the method includes steps of suspending a connection with the network; selecting one of a first connection procedure or a second connection procedure based on a cause value of a connection provided from a higher layer; and performing the selected connection procedure, wherein the cause value of the connection is determined according to a type of data to be transmitted.

Preferably, the step of suspending the connection comprises storing a UE context.

Further, in accordance with another example of the present invention, a user equipment (UE) in a wireless communication system is disclosed. Especially, the UE includes a radio frequency (RF) unit; and a processor connected with the RF unit and configured to suspend a connection with a network, select one of a first connection procedure or a second connection procedure based on a cause value of a connection provided from a higher layer, and perform the selected connection procedure, wherein the cause value of the connection is determined according to a type of data to be transmitted.

Preferably, the processor stores a UE context when suspending the connection with the network.

As for the above examples of the present invention, the first connection procedure comprises a connection establishment procedure, and the second connection procedure comprises a connection resuming procedure. Especially, the connection resuming procedure is performed using a stored UE context.

More specifically, if the cause value of the connection corresponds to a MO (Mobile Originating) signaling, the selected procedure is the first connection procedure. However, if the cause value of the connection corresponds to one of MO (Mobile Originating) data, MT (Mobile Terminating) access, high priority access, delay tolerant access, emergency or mo-Exception-Data, the selected procedure is the second connection procedure.

It is to be understood that both the foregoing general description and the following detailed description of the present invention are exemplary and explanatory and are intended to provide further explanation of the invention as claimed.

Advantageous Effects of Invention

According to embodiments of the present invention, the UE can connect with the network efficiently in the wireless communication system.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
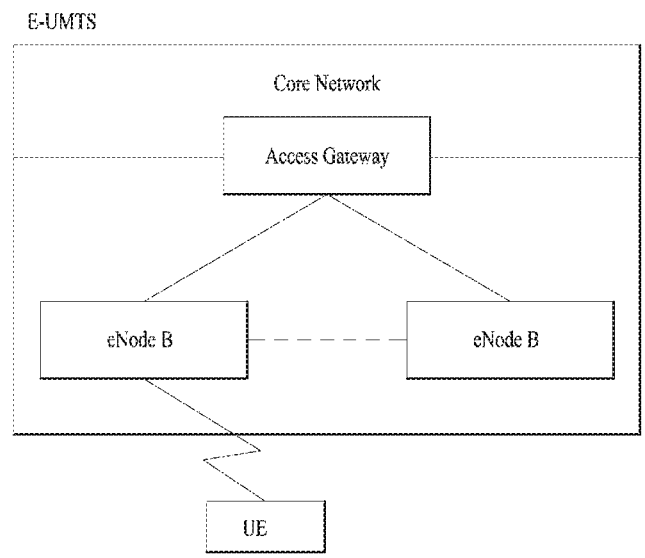
FIG. 1 is a diagram showing a network structure of an Evolved Universal Mobile Telecommunications System (E-UMTS) as an example of a wireless communication system.
Figure 2:
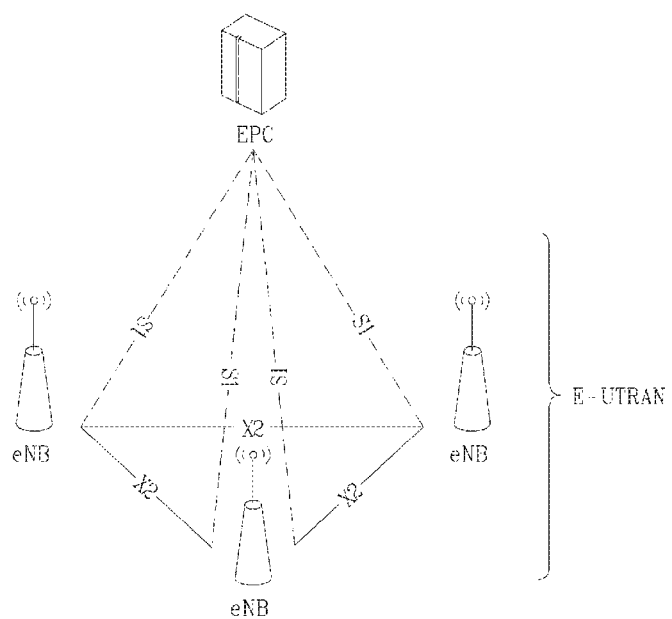
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
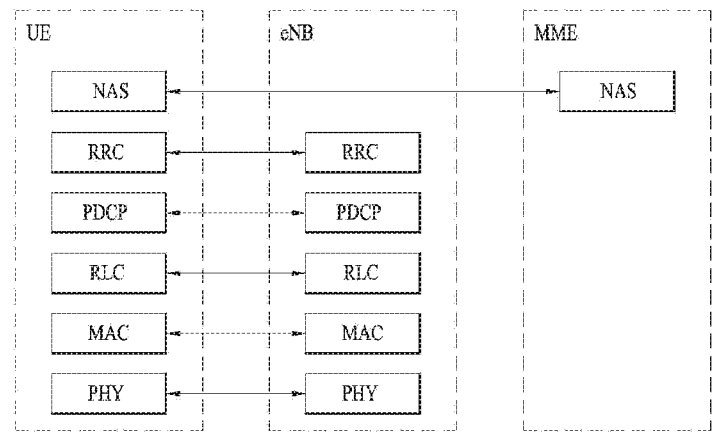
FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.
Figure 3:
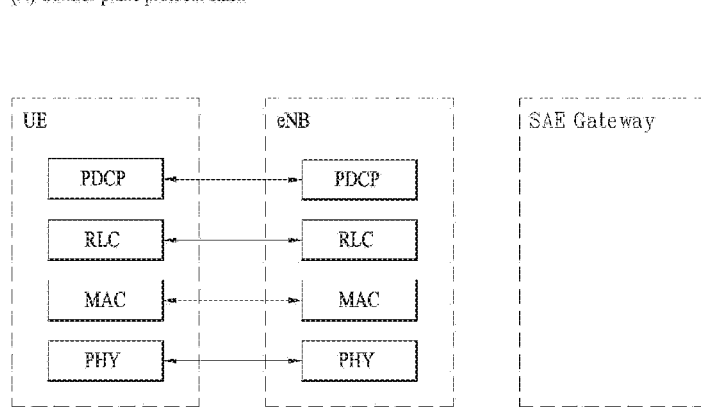

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
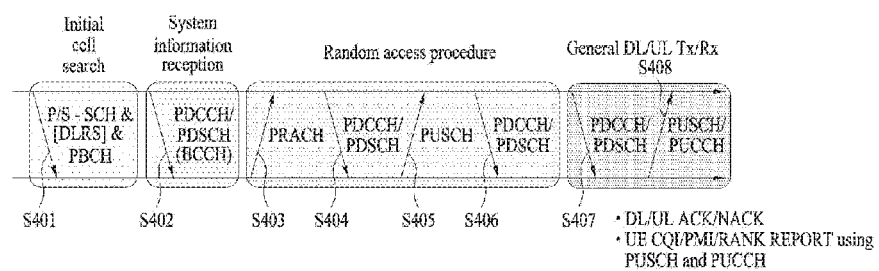
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DLRS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 5:
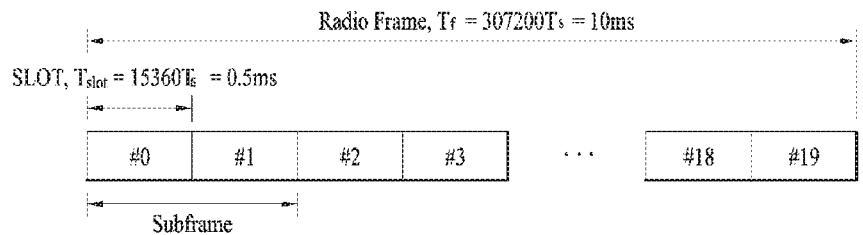
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms (327200×Ts) and includes 10 subframes with the same size. Each subframe has a length of 1 ms and includes two slots. Each slot has a length of 0.5 ms (15360×Ts). Ts denotes a sampling time, and is represented by Ts=1/(15 kHz×2048) =3.2552?10$^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

Figure 6:
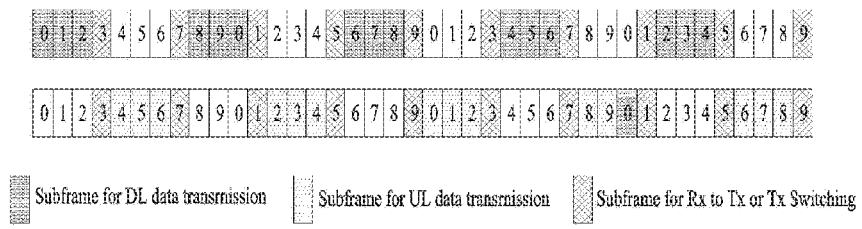
FIG. 6 is an example for data transmission and reception for a Category 0 low complexity UE.
Figure 7:
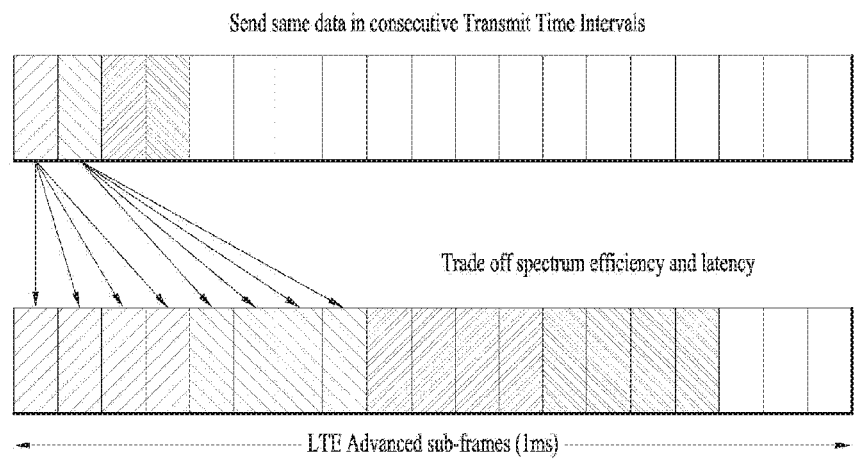
FIG. 7 is an example for repetitions for data transmission for a Category 0 low complexity UE.

FIG. 6 is an example for data transmission and reception for a Category 0 low complexity UE, and FIG. 7 is an example for repetitions for data transmission for a Category 0 low complexity UE.

Such a communication technology as MTC is specialized from 3GPP to transmit and receive IoT-based information and the MTC has a difference according to each release of the technology. Release 10 and Release 11 are focusing on a method of controlling loads of IoT (M2M) products and a method of making the loads have least influence on a network when the IoT products make a request for accessing an eNB at the same time. Release 12 and Release 13 are focusing on a low-cost technology enabling a battery to be simply implemented and very little used by reducing complicated functions mounted on a legacy smartphone as many as possible.

Low complexity UEs are targeted to low-end (e.g. low average revenue per user, low data rate, delay tolerant) applications, e.g. some Machine-Type Communications.

A low complexity UE has reduced Tx and Rx capabilities compared to other UE of different categories.

In particular, a low complexity UE does not require such a function of high performance as a function of a smartphone and an amount of data used by the low complexity UE is not that big in general. Hence, there is no reason for a complicated and high-price communication module to come to the market for such a UE as the low complexity UE.

In order to manufacture a low-cost IoT (M2M) device, a concept such as UE Category 0 has been introduced. A UE category corresponds to a general figure used in 3GPP to indicate the amount of data capable of being processed by a UE in a communication modem. In general, as the amount of data to be processed is getting bigger, a price of a modem is also increasing due to a memory or performance enhancement. In case of a currently commercialized smartphone, performance of the smartphone is continuously increasing from 100 Mbps to 150 Mbps and 300 Mbps on the basis of download.

Table 1 shows UE categories used in 3GPP.

TABLE 1

| UE Category | Downlink (velocity) | Uplink (velocity) |
|---|---|---|
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbp |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A Category 0 low complexity UE may access a cell only if SIB1 indicates that access of Category 0 UEs is supported. If the cell does not support access of Category 0 UEs, the UE considers the cell as barred.

The eNB determines that a UE is a Category 0 UE based on the LCID for CCCH and the UE capability.

The S1 signaling has been extended to include the UE Radio Capability for paging. This paging specific capability information is provided by the eNB to the MME, and the MME uses this information to indicate to the eNB that the paging request from the MME concerns a low complexity UE.

And, since it is able to perform transmission and reception on specific time only without performing transmission and reception at the same time like FIG. 6, it may be able to perform an operation of TDD in FDD (since transmission and reception are not performed at the same time). Additionally, unlike legacy TDD, since it is able to provide sufficient switching time as much as 1 ms to a section at which switching is performed between transmission and reception, it is able to expect a revolutionary cost reduction effect in terms of overall hardware part especially a modem and an RF. On the contrary, according to a regulation of a legacy LTE UE, it is mandatory to use at least 2 or more reception antennas.

NB-IoT (Narrow Band Internet of Things) provides access to network services using physical layer optimized for very low power consumption (e.g. full carrier bandwidth is 180 kHz, subcarrier spacing can be 3.75 kHz or 15 kHz).

As indicated in the relevant subclauses in this specification, a number of E-UTRA protocol functions supported by all Rel-8 UEs are not used for NB-IoT and need not be supported by eNBs and UEs only using NB-IoT. For NB-IoT, the narrowband physical downlink control channel (NPDCCH) is located in available symbols of configured subframes. Within a PRB pair, two control channel elements are defined, with each control channel element composed of resources within a subframe. NPDCCH supports aggregations of 1 and 2 control channel elements and repetition. NPDCCH supports C-RNTI, Temporary C-RNTI, P-RNTI, and RA-RNTI.

The contention-based random access is supported for NB-IoT. Configuration of RACH parameters may be different per coverage level. RACH attempts/reattempts should follow the assumptions listed below: i) Multiple RACH attempts are supported, ii) RACH reattempts may be done on the same or different coverage level, iii) Triggering too many attempts needs to be avoided. There will be one or more thresholds that limit the number of attempts, MAX NUMBER OF ATTEMPTS or similar per coverage level, and iv) MAC indicates random access problem to the RRC layer, when MAC has exhausted all attempts for a RACH procedure.

RAN node can determine the UE's coverage level from the random access procedure.

How this is done depends on the physical layer RACH design. The original eMTC design, e.g. by using S1 Context Release message to indicate coverage level, can be used as the baseline, at least for the UP solution. The CN may include coverage enhancement (CE) level information, Global Cell Id and Paging Attempt Count IE in the Paging message to indicate related information to the RAN node. In idle mode, UEs in general do not make specific access only to report coverage level change.

For NB-IoT, Asynchronous adaptive HARQ is supported, a single HARQ process is supported for dedicated transmissions (1 for UL and 1 for DL), and An NB-IoT UE only needs to support half duplex operations.

For NB-IoT, the RLC layer supports the following functions: i) Transfer of upper layer PDUs, ii) Concatenation, segmentation and reassembly of RLC SDUs. But the following RLC layer functions are assumed not supported: i) Reordering of RLC data PDUs (dependent on HARQ mechanism), ii) Duplicate detection (dependent on HARQ mechanism), and iii) the RLC UM is not supported.

The PDCP layer supports the following functions: i) PDCP SN size is 7 bits (or less), ii) Transfer of data (user plane or control plane), iii) Header compression and decompression of IP data flows using the ROHC protocol, iv) Ciphering and Integrity Protection, and v) Ciphering and deciphering. But the following PDCP layer functions are assumed not supported: i) In-sequence delivery of upper layer PDUs at PDCP re-establishment procedure for RLC AM (dependent on support of RRC reestablishment and RLC-AM), ii) Duplicate detection and duplicate discarding of lower layer SDUs at PDCP re-establishment procedure for RLC AM (dependent on support of RRC reestablishment and RLC-AM), iii) Duplicate detection and duplicate discarding of lower layer SDUs at PDCP re-establishment procedure for RLC AM (dependent on support of RRC reestablishment and RLC-AM, iv) For split bearers, routing and reordering, and v) PDCP status report.

In particular, discussion on a solution for a performance deterioration problem caused by decrease of output power is in progress by considering a scheme of performing repetitive transmission as shown in FIB. 7 or a TTI bundling technology previously used in VoLTE (Voice of LTE, LTE voice call service). Consequently, it might say that it is able to develop a communication module of low complexity through the low-cost IoT (M2M) technology explained in the Release 12 and the low-power IoT (M2M) technology to which the Release 13 is targeting.

In this invention, it is discussed about the procedure for establishing RRC connection with a network at a UE. Especially, in the present invention, the procedure for establishing RRC connection may depends on the characteristics of the data. Since depending on the call type or establishment cause, more simple connection establishment procedure compared to the existing RRC connection establishment procedure can be used. In other words, less steps could be required to establish or resume RRC connection with the network for a certain call type. In the following, it is assumed that the UE is in suspended state. In other words, the UE has a valid stored UE context.

First Embodiment

According to a First Embodiment of the present invention, the procedure for establishing RRC connection may be varied based on corresponding data.

Step 1: The upper layer indicates the call type and/or RRC establishment cause value to the lower layer and provides the associated NAS message (e.g. service request, TAU request message).

The characteristics of the data can be classified according to the call type and/or RRC connection establishment cause value. The example of call type/cause value are MO (Mobile Originating) signaling, MO data, MT (Mobile Terminating) access, High priority access, Delay tolerant access, Emergency or mo-Exception-Data. Especially, said MO signaling should be provided upto a core network. However, all examples of call type/cause value except for the MO signaling are not required to be provided upto the core network.

Step 2: If the UE has a stored UE context (i.e., if the UE is in suspended state), depending on the indicated call type/RRC connection establishment cause value, the type of the procedure of establishing RRC connection procedure is different from a legacy procedure.

For example, If MO signaling for cause value is signaled from upper layer, the first type of RRC connection establishment procedure is used. While, if other cause value is signaled from upper layer, the second type of RRC connection establishment procedure is used.

Here, the first type of RRC connection establishment procedure means a legacy RRC connection establishment procedure using the message such as RRCConnectionRequest, RRCConnectionSetup, RRCConnectionSetupComplete. The first RRC message in message 3 includes random value or S-TMSI as UE identity. However, the second type of RRC connection establishment procedure means the procedure for resuming the RRC connection using the stored UE context.

Figure 8:
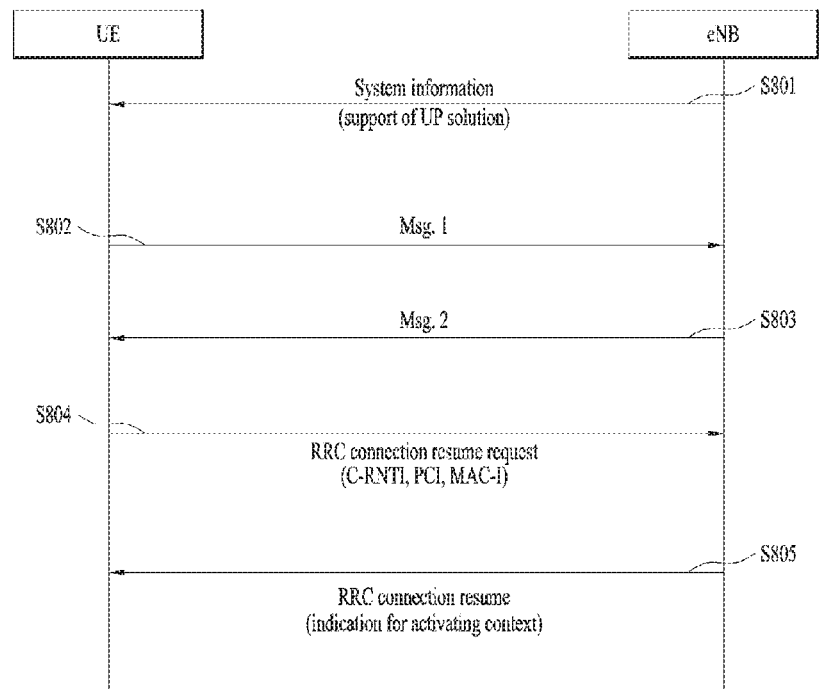
FIG. 8 is an example for a procedure for resuming a RRC connection.

FIG. 8 is an example for a procedure for resuming a RRC connection. Especially, in FIG. 8, it is assumed that the UE has a stored UE context receiving during the previous RRC connection.

Referring to FIG. 8, in S801, the network (i.e., the eNB) provides the indication on whether a cell supports UP (user plane) solution via system information. Next, in S802 and S803, the UE may transmit a random access preamble (Msg. 1) to the network, and receive a random access response (RAR) message (Msg. 2) from the network.

In S804, after Msg. 2 (RAR) reception during random access procedure, the UE sends the first RRC message to request RRC connection resume message. The message includes C-RNTI, PCI and/or MAC-I. Finally, in S805, after transmitting the above first RRC message, the UE receives the response message (e.g., RRC connection resume message) from the network. The response message includes the indication on whether to activate the stored UE context.

Second Embodiment

According to a second Embodiment of the present invention, the upper layer indicates the call type and/or RRC establishment cause value to the lower layer and provides the associated NAS message (e.g., service request message or TAU (tracking area update) request message). The characteristics of the data can be classified according to the call type and/or RRC connection establishment cause value. The example of call type/cause value are same stated in the first embodiment.

Next, the UE sends the message for requesting resumption, which includes the resume ID (e.g., C-RNTI/cell identity) and authentication token (e.g., shortMAC-I) to the network. Here, said C-RNTI/cell identity may include a physical cell identity (PCI).

In this case, for the resumption request message, the network may respond to inform that Msg. 5 is required or the resumption is accepted or the resumption is failed.

More specifically, a response message for informing that Msg. 5 is required indicates that the UE is required to send the Msg. 5 including NAS messages. In case of RRC connection establishment cause value of MO-data, mo-Exception-Data or MT access, the network may send this response message for the cases that the resumption fails due to authentication failure, no context for the UE or mismatch between the context of the UE and the context of the network. In case of RRC connection establishment cause value of MO-signaling, the network always sends this response message.

While, the response message for informing that the resumption is accepted indicates that the UE's resumption request is accepted so that the store UE context (e.g. bearer configuration, security) is used. In this case, the response message is sent to the UE only when resumption request succeeds in the network. Finally, the response message for informing that the resumption is failed indicates that UE's resumption request has failed so that the UE is required to remove the stored UE context.

If the UE receives 'Msg. 5 required' indication in Msg. 4, the UE sends the Msg. 5 including service request and/or TAU request. Otherwise, the UE does not send Msg. 5 including service request and/or TAU request.

Alternatively, if the UE receives 'Resumption accept' or 'Resumption failure' indication in Msg. 4 and the RRC establishment cause value is 'MO-signaling', the UE sends the Msg. 5 (e.g., RRC connection setup (resume) complete message) including TAU request. Other than RRC connection reject which delays the trial of RRC connection establishment trial using (extended) wait time, the UE sends the Msg. 5 (e.g. RRC connection setup (resume) complete message) including the TAU request.

Further, if the UE receives 'Resumption accept' and the RRC establishment cause value is other than MO signaling (e.g. 'MO-data'/MT-access/delay-tolerant/mo-Exception-Data), the UE does not send Msg. 5 including e.g. service request. If the UE receives 'Resumption failure' and the RRC establishment cause value is other than MO signaling (e.g., 'MO-data'/MT-access/delay-tolerant/mo-Exception-Data), the UE sends the Msg. 5 (e.g. RRC connection setup (resume) complete) including e.g. service request. Alternatively, if the UE receives 'Resumption failure' and the RRC establishment cause value is other than MO signaling (e.g., MO-data'/MT-access/delay-tolerant/mo-Exception-Data), the UE starts from sending random access procedure and sends the legacy RRC connection request message/RRC connection setup complete message to the network.

Figure 9:
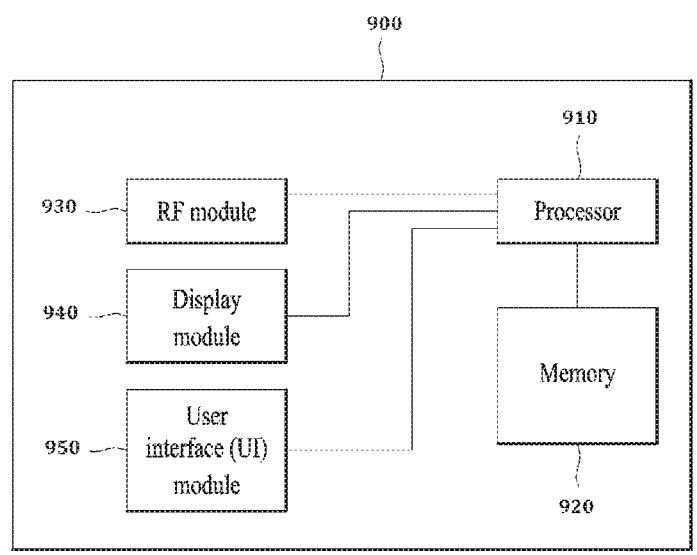
FIG. 9 is a block diagram of a communication apparatus according to an embodiment of the present invention.

FIG. 9 is a block diagram illustrating a communication apparatus in accordance with an embodiment of the present invention.

Referring to FIG. 9, a communication device 900 includes a processor 910, a memory 920, a Radio Frequency (RF) module 930, a display module 940, and a user interface module 950.

The communication device 900 is illustrated for convenience of the description and some modules may be omitted. Moreover, the communication device 900 may further include necessary modules. Some modules of the communication device 900 may be further divided into sub-modules. The processor 910 is configured to perform operations according to the embodiments of the present invention exemplarily described with reference to the figures. Specifically, for the detailed operations of the processor 910, reference may be made to the contents described with reference to FIGS. 1 to 8.

The memory 920 is connected to the processor 910 and stores operating systems, applications, program code, data, and the like. The RF module 930 is connected to the processor 910 and performs a function of converting a baseband signal into a radio signal or converting a radio signal into a baseband signal. For this, the RF module 930 performs analog conversion, amplification, filtering, and frequency upconversion or inverse processes thereof. The display module 940 is connected to the processor 910 and displays various types of information. The display module 940 may include, but is not limited to, a well-known element such as a Liquid Crystal Display (LCD), a Light Emitting Diode (LED), or an Organic Light Emitting Diode (OLED). The user interface module 950 is connected to the processor 910 and may include a combination of well-known user interfaces such as a keypad and a touchscreen.

The above-described embodiments are combinations of elements and features of the present invention in a predetermined manner Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for connecting with a network at a user equipment (UE) in a wireless communication system and an apparatus therefor has been described centering on an example applied to the 3GPP LTE system, the present invention is applicable to a variety of wireless communication systems in addition to the 3GPP LTE system.

What is claimed is:

1. A method for communicating with a network at a user equipment (UE) in a wireless communication system, the method comprising:
   suspending a connection with the network and storing a UE context associated with the suspended connection;
   transmitting a connection resume request message to the network via a higher layer;
   in response to the connection resume request message, receiving a response message from the network,
   wherein the response message indicates an acceptance of a connection resume or a failure of the connection resume,
   wherein the response message further includes a RRC connection establishment cause value, the RRC connection establishment cause value corresponding to a call type,
   wherein, based on the RRC connection establishment cause value corresponding to a MO (Mobile Originating) signaling, a connection resume complete message is transmitted to the network regardless of whether the response message indicates the acceptance of connection resume or the failure of the connection resume,
   wherein, based on the RRC connection establishment cause value corresponding to a one of Mobile Terminating (MT) access, high priority access, delay tolerant access, emergency or mo-Exception-Data and when the response message indicates the acceptance of the connection resume, the store UE context is removed,
   wherein, based on the RRC connection establishment cause value corresponding to one of the MT access, the high priority access, the delay tolerant access, the emergency or the mo-Exception-Data and when the response message indicates the failure of the connection resume, a random access procedure is started.

2. A user equipment (UE) in a wireless communication system, the UE comprising:
   a radio frequency (RF) unit; and
   a processor connected with the RF unit and configured to:
      suspend a connection with the network and store a UE context associated with the suspended connection;
      transmit a connection resume request message to the network via a higher layer, and
      in response to the connection resume request message, receiving a response message from the network,
      wherein the response message indicates one of an acceptance of a connection resume or a failure of the connection resume,
      wherein the response message further includes a RRC connection establishment cause value, the RRC connection establishment cause value corresponding to a call type,
   wherein, based on the RRC connection establishment cause value corresponding to a MO (Mobile Originating) signaling, a connection resume complete message is transmitted to the network regardless of whether the response message indicates the acceptance of connection resume or the failure of the connection resume,
   wherein, based on the RRC connection establishment cause value corresponding to a one of Mobile Terminating (MT) access, high priority access, delay tolerant access, emergency or mo-Exception-Data and when the response message indicates the acceptance of the connection resume, the store UE context is removed,
   wherein, based on the RRC connection establishment cause value corresponding to one of the MT access, the high priority access, the delay tolerant access, the emergency or the mo-Exception-Data and when the response message indicates the failure of the connection resume, a random access procedure is started.

* * * * *